(12) United States Patent
Thomas

(10) Patent No.: US 6,396,777 B1
(45) Date of Patent: May 28, 2002

(54) COMPACT DISK PLAYER INSTANT-ON FEATURE

(75) Inventor: Steven Paul Thomas, Westfield, IN (US)

(73) Assignee: Delphi Technologies, Inc., Troy, MI (US)

( * ) Notice: Subject to any disclaimer, the term of this patent is extended or adjusted under 35 U.S.C. 154(b) by 238 days.

(21) Appl. No.: 09/579,227

(22) Filed: May 30, 2000

(51) Int. Cl.[7] ............................................. G11B 17/22
(52) U.S. Cl. .................................. 369/30.24; 369/30.36
(58) Field of Search ........................ 369/30.24, 30.36, 369/30.27, 30.28, 30.1, 30.11

(56) References Cited

U.S. PATENT DOCUMENTS

| | | | | | |
|---|---|---|---|---|---|
| 5,148,417 A | * | 9/1992 | Wong et al. | ................... | 369/32 |
| 5,365,502 A | * | 11/1994 | Misono | ........................ | 369/18 |
| 5,410,525 A | * | 4/1995 | Yokota | ......................... | 369/32 |
| 5,430,703 A | * | 7/1995 | Tsuji et al. | .................... | 369/60 |
| 5,463,601 A | * | 10/1995 | Yanagisawa | ................. | 369/32 |
| 5,621,712 A | * | 4/1997 | Nonaka | ........................ | 369/60 |
| 5,831,946 A | * | 11/1998 | Bie | .............................. | 369/33 |
| 6,188,650 B1 | * | 2/2001 | Hamada et al. | ................ | 369/33 |

* cited by examiner

*Primary Examiner*—Tan Dinh
(74) *Attorney, Agent, or Firm*—Jimmy L. Funke

(57) ABSTRACT

A disk drive resumes supplying audio information without the hesitation normally attributed to disk access time. Initially, an indication is received that the disk drive should be deactivated. Next, audio information is stored from a beginning position, where audio information was last provided, to a resume position. Then, the resume position at which the disk drive should begin retrieving audio information, when the disk drive is reactivated, is stored. Finally, the disk drive is deactivated. In this manner, when the disk drive is reactivated, the stored audio information is supplied without the hesitation normally attributed to the disk access time of the disk drive.

22 Claims, 4 Drawing Sheets

COMPACT DISK PLAYER INSTANT-ON FEATURE

TECHNICAL FIELD

The present invention is directed to a compact disk (CD) player, and more specifically to a CD player that resumes supplying audio information without the hesitation normally attributed to disk access time.

BACKGROUND OF THE INVENTION

As is well known to one of ordinary skill in the art, a typical audio compact disk (CD) is generally made of a polycarbonate with one or more metal layers. Information on a typical audio CD is encoded as a digital '0' or a digital '1' depending upon the presence or absence of pits in the surface of the CD. The audio information is read from the CD by a read head assembly, included within a CD player. A typical read head assembly includes an infrared laser diode, a reflecting mirror and a focusing lens. The laser diode emits a beam of light that is aimed at the reflecting mirror. The emitted light reflects off the mirror and through the focusing lens, which directs the light onto a specific point on the surface of the CD. The conventional read head assembly moves across the CD on a set of rails, similar to a head assembly of a floppy disk drive. The position of the read head assembly is controlled by a servo system that is controlled by a processor embedded within the CD player.

A certain amount of light, which depends upon where on the surface of the CD the light beam strikes, is reflected from the CD. A series of collectors, mirrors and lenses collect and provide the reflected light to a photodetector. The photodetector transforms the received reflected light into electrical energy with the level of the signal being dependent upon how much light was reflected from the CD. The level of the transformed signal determines whether the information read was a digital '0' or a digital '1'.

A spindle motor of the CD player rotates the CD such that the information can be read from the CD. The spindle motor employed in a standard CD player is typically different from that of a conventional hard drive or floppy drive in that the spindle motor in a CD player may not spin at a constant speed. That is, in some CD players, the speed of the spindle motor varies depending upon what part of the disk (inside or outside) is being read. In CD players that vary the spindle motor speed, when the read head assembly is positioned near the radial outside edge of the disk, the motor runs slower, as compared to when it is positioned radially inward where the motor runs faster. This reading technique, known as constant linear velocity (CLV), was implemented to ensure the same amount of data was read from a CD, each second, irrespective of what part of the CD was being accessed.

The CLV reading technique was necessary because, historically, CD players did not have the necessary intelligence or memory to allow them to deal with information arriving at different rates. In CD players of this type, the speed of the spindle motor is usually tied to the positioning of the read head assembly. Typically, the information coming from the CD is used to synchronize the speed of the motor and make sure the CD is running at the correct speed. An alternative technology utilized in some CD players, known as constant angular velocity (CAV), rotates the CD at a constant speed regardless of what area of the disk is being accessed.

A typical CD-ROM, utilized with a personal computer system, can transfer both data and audio information. When transferring audio information from a CD, the information is transferred directly to a sound card, via an audio cable. However, when the CD-ROM is transferring data, the data is transferred to a processor of the computer system. If the data is a music file (e.g., .wav file), the music file is then typically transferred to a sound card. A typical CD-ROM drive includes an interface (e.g., an intelligent drive electronics (IDE) interface, enhanced IDE interface, an advanced technology attachment packet interface (ATAPI), a small computer system interface (SCSI), a standard parallel interface, or a proprietary interface) that connects the CD-ROM drive to the computer system. The CD-ROM drive may further include a stereo headphone output, a volume control dial, start and stop buttons, and next track and previous track buttons.

Historically, CDs were read-only storage devices (e.g., audio CDs and compact disk-read-only memories (CD-ROMs)). However, today a number of writeable CDs, such as compact disk-rewriteable (CD-RW), compact disk-recordable (CD-R) and various types of digital versatile disks (DVDs) are commercially available. Most CD-RW, CD-R and DVD drives are considered backwards compatible with CD-ROMS and audio CDs. Most CD drives that are utilized to store data (e.g., applications), for use with a computer system, have on-board memory that is used to buffer data that is read from a CD. However, this on-board memory has generally not been used to buffer audio information as audio information has typically been provided directly to the audio system (e.g., a sound card) as it is read from the CD. On the other hand, automotive CD players that have electronic skip protection normally buffer audio information in conjunction with this feature.

During normal use of an audio system, a user typically may change from a CD player to a radio subsystem or alternatively to a tape subsystem. When this transition occurs, the spindle motor of the CD player is typically turned off or deactivated. As a result, when a user reselects the CD player, the audio system cannot output audio information until the CD spins up to the reading speed and the read head assembly is moved into position. During this time, the conventional audio system is not providing sound. This delay is typically in the range of 4 to 5 seconds, which is long enough that many users of the audio system may become confused as to whether an appropriate switch or command was received by the audio system. During this delay time, the user may push various buttons of the audio system or adjust the volume control up thinking it was turned down. In the latter case, when the audio information is provided, the audio information may be unpleasantly loud.

As such, a CD player that minimizes the hesitation normally attributed to disk access time is desirable. More particularly, a CD player that almost immediately provides audio information such that a user knows that their selection was received by the audio system is desirable.

SUMMARY OF THE INVENTION

The present invention is directed to a method and system that allows a disk drive to resume supplying audio information without the hesitation normally attributed to disk access time. Initially, an indication is received that the disk drive should be deactivated. Next, audio information is stored from a beginning position, where audio information was last provided, to a resume position. Then, the resume position at which the disk drive should begin retrieving audio information, when the disk drive is reactivated, is stored. Finally, when the disk drive is reactivated, the stored audio information is supplied without the hesitation normally attributed to the disk access time of the disk drive. In one embodiment, the resume position corresponds to a period that is at least equal in time to an access time of the disk drive.

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
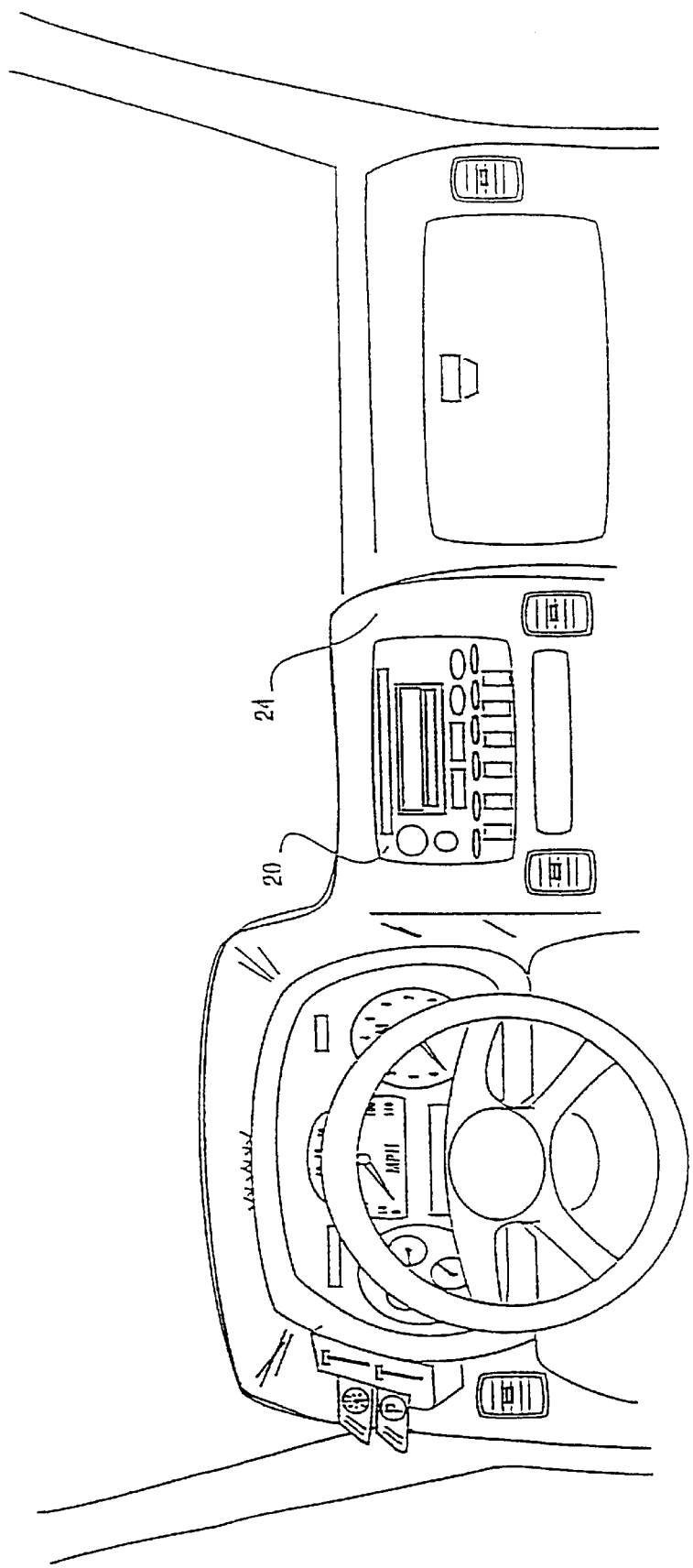
FIG. 1 is a front view of an exemplary dash of a vehicle that includes a CD player.

The present invention is directed to a technique that allows a compact disk (CD) player to resume playing audio information (e.g., music) almost instantaneously. As used herein, the term 'CD player' is interchangeable with the term 'CD drive' and is meant to encompass any type of device (e.g., CD-ROM, CD-ROM/XA, CD-I, CD-R, CD-RW, DVD, DVD-RAM, DVD+RW) that can read audio CDs or that includes sequentially or nonsequentially stored information that benefits from the techniques disclosed herein. The techniques disclosed herein allow a CD player to function in a manner similar to that of a radio receiver. That is, when a user switches from one radio station to another, audio information is provided almost instantaneously. With a typical prior art CD player, a delay of 4–5 seconds commonly occurs before music is provided when the CD player is reactivated. This delay is a result of the time that is required to spin a compact disk (CD) up and move the read head assembly into position (where the music previously left off).

A CD player, according to an embodiment of the present invention, continues storing data in a memory, preferably for a time period that is at least equal to the CD player's disk access time, after the CD player receives a deactivation signal. The amount of stored data is CD player dependent and is preferably equal to the maximum access time of the CD player. When a listener reactivates the CD player, the CD player provides audio information from the memory while a selected disk spins up and the read head assembly moves into position (to provide new audio information). When the read head assembly is positioned at the correct track and time, the CD player provides new audio information to the audio system. This technique is applicable to home audio CD player subsystems, automotive CD player subsystems and computer systems that utilize a CD-ROM drive to provide audio information, among others. In the preferred embodiment, the invention is implemented in software that is stored within memory of the CD player subsystem. As used herein, the term 'processor' may include a general purpose processor, a microcontroller (i.e., an execution unit with memory, etc., integrated within a single integrated circuit) or a digital signal processor.

Many commercially available CD players include the capability of remembering at what point an audio CD last provided music. In this manner, the CD player subsystem can resume playing music at the point where it last provided music. This feature allows a CD player to behave in a similar manner to a cassette tape player (i.e., the tape resumes where it left off because the tape is in the same physical position). In a preferred embodiment, a memory within the CD player subsystem is provided to store audio information until the CD player can position the read head assembly to resume reading audio information. As used herein, the term 'access time' includes the maximum time that it takes a given CD player to spin a CD to a desired speed (from a stopped position) and move the read head assembly to a desired location. In a CD player that implements electronic skip protection, it is contemplated that the memory utilized to store read ahead information for the skip protection feature can also be utilized to store audio information for the instant-on feature. As such, no additional memory would be required to implement the instant-on feature in such a CD player.

An active CD player, implementing the present invention, that has a maximum access time of five seconds, will store audio information for five seconds after the CD player receives a deactivation signal. For example, if the CD player is playing music at time 1:21 (min.:sec.) of track four, the CD player will store audio information until time 1:26 of track four. One of ordinary skill in the art will readily appreciate that, depending upon the current location on a particular track, it may be necessary to store audio information from multiple tracks or multiple CDs (in a random access CD player that includes a multiple CD carrier). A deactivation signal can be generated, for example, when a user (while listening to music provided by the currently active CD) selects an AM radio station. The processor of the audio system then sets the audio source to AM and tunes the frequency of the radio receiver to the selected station. Under control of the CD player subsystem processor, memory of the CD player stores audio information from time 1:21 of track four to time 1:26 of track four. Next, the CD player subsystem processor stores a resume play position of time 1:26 of track four. When the user reselects the CD player as the audio source for the audio system, the CD player will provide audio information from the memory and concurrently begin the physical process of spinning the CD up and moving the read head assembly to a particular point (in this example to time 1:26 of track four). When the audio information from the memory is exhausted, the data source is switched from the memory to the read head assembly, which is positioned at time 1:26 of track four. As a result, the CD player subsystem provides music, similar to a radio receiver, without the pause normally associated with disk access time.

It is also contemplated that the present invention can be implemented in CD players that include a random play feature (i.e., CD players that perform non-sequential access). These CD players may include carriers for single or multiple CDs. CD players, that include a single CD carrier, may be programmed to play a non-sequential track from a CD. For example, if a currently active track is track eight, a next track may be track five. In this case, a random play CD player, that implements the present invention, may need to store information from both tracks eight and five (depending on the length and duration of track five) of a currently active CD.

In this situation, the stored resume position will correspond to an appropriate time of track five of the currently active CD. In CD players that include a multiple carrier CD, a different CD may need to provide information for storing. For example, if a first CD (i.e., the currently active CD) is providing music from track one and a second CD is randomly selected to provide music from track five (upon completion of track one of the first CD), it may be necessary to also store information from track five of the second CD (depending on the length and duration of track one of the first CD).

Figure 2:
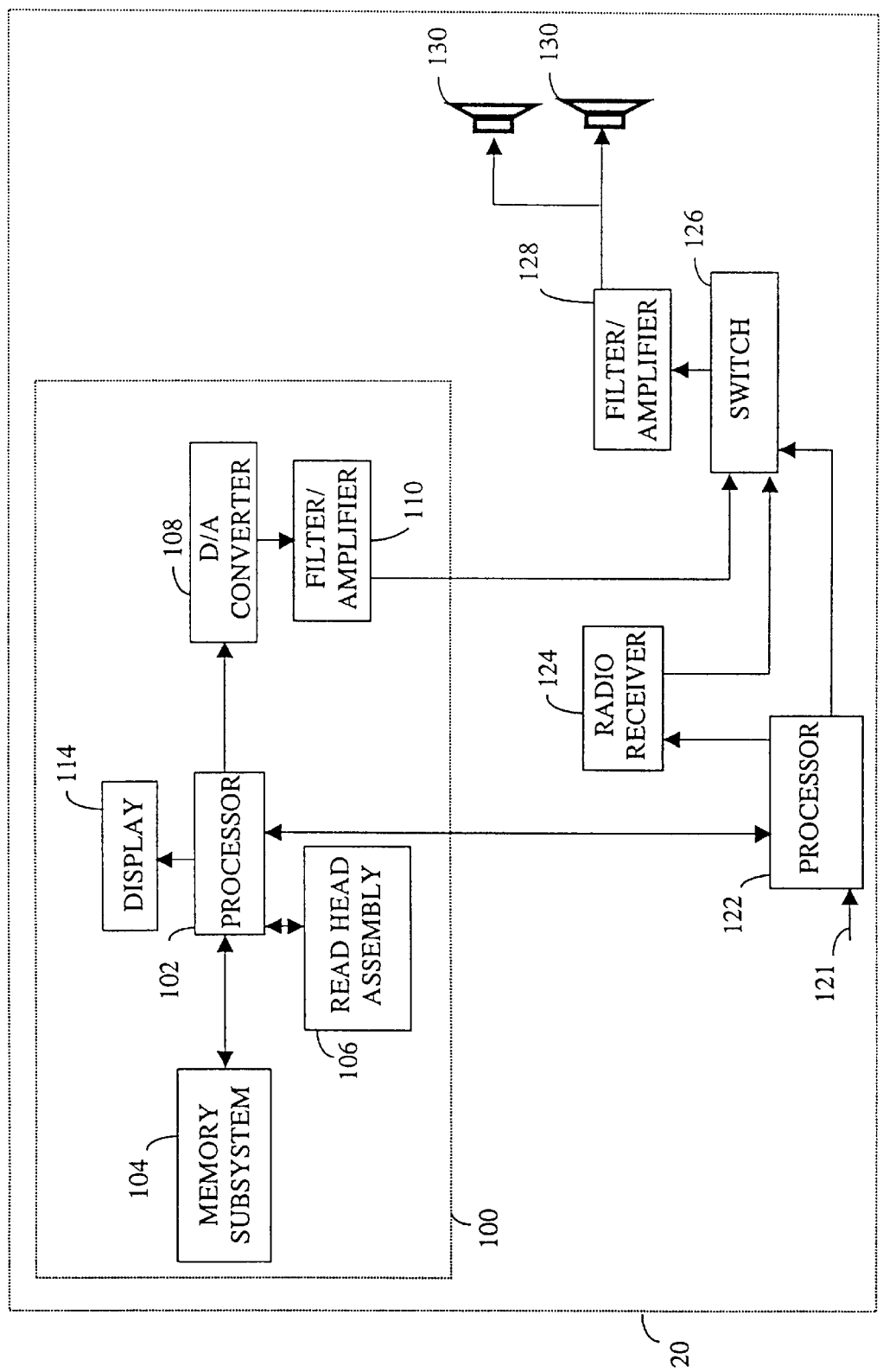
FIG. 2 is an electrical block diagram of an audio system including a CD player subsystem implementing the present invention.

FIG. 1 shows a portion of an audio system 20, located in a front instrument panel 24 of an automotive vehicle, that includes a CD player subsystem, as is further described below. FIG. 2 depicts an electrical block diagram of an audio system 20 that includes a CD player subsystem 100. CD player subsystem 100 includes a processor 102 that is coupled to a display 114, a memory subsystem 104, a read head assembly 106 and a digital-to-analog (D/A) converter 108. Memory subsystem 104 includes an application appropriate amount of volatile memory (e.g., dynamic random access memory (DRAM)) and non-volatile memory (e.g., flash memory, electrically erasable programmable read-only memory). Read head assembly 106 supplies audio information read from a currently active CD to processor 102.

Processor 102 provides the read audio information to D/A converter 108. D/A converter 108 converts the digital audio information to analog audio information and supplies the information to a filter amplifier 110. Filter amplifier 110 is coupled to a switch 126 of audio system 20. Processor 102 is also coupled to audio processor 122, for inter-processor communication. As shown, audio processor 122 is coupled to a radio receiver 124 and switch 126. Audio processor 122 receives an input 121 and, based upon that, input controls switch 126. Input 121 is, for example, provided by a select switch, which allows a user to change the audio source from the CD to the radio. Switch 126 provides the selected input (i.e., input from radio receiver 124 or input from filter amplifier 110) to filter/amplifier 128. Filter/amplifier 128, in turn, provides the selected audio information after filtering and amplification to speakers 130. Processor 102 is also coupled to a display 114, which is utilized for supplying various information to a user of the system.

Figure 3:
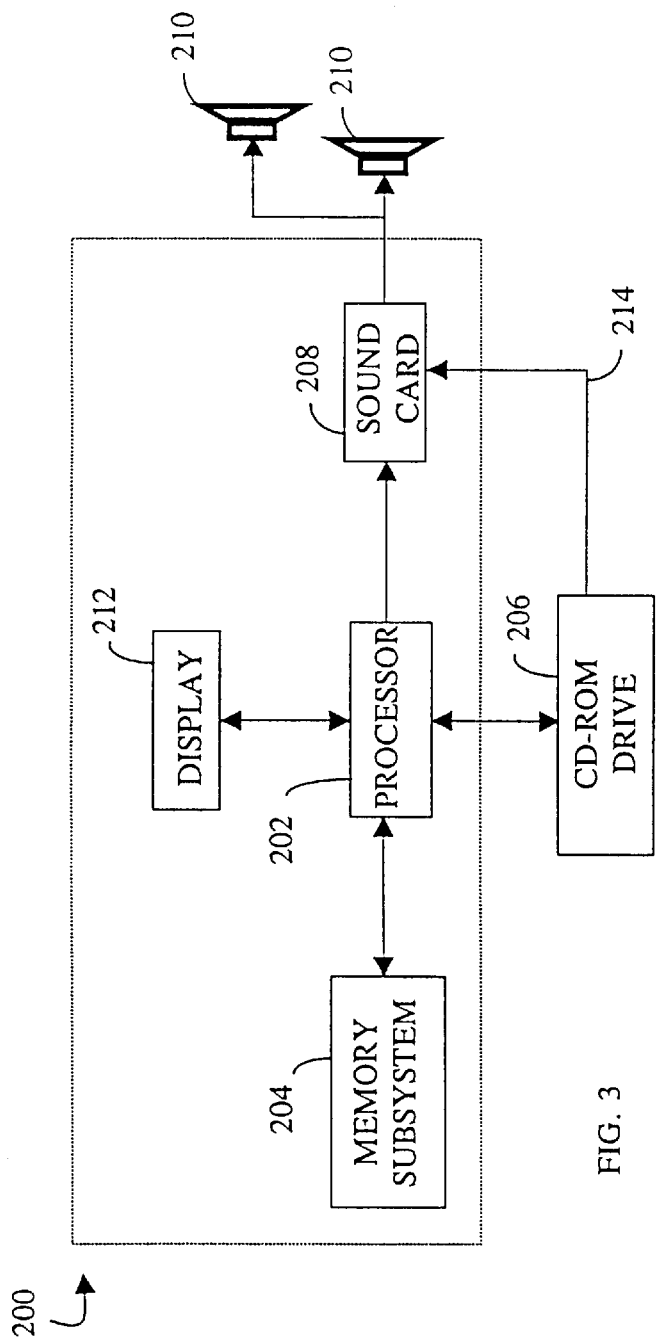
FIG. 3 is an electrical block diagram of a computer system that includes a CD-ROM drive.

FIG. 3 shows an electrical block diagram of a computer system 200 that utilizes a CD-ROM drive 206. CD-ROM drive 206 is constructed in a manner similar to that of CD player subsystem 100 (FIG. 2). Processor 202 is coupled to a display 212, a memory subsystem 204, a sound card 208 and CDROM drive 206. Processor 202 is preferably coupled to CD-ROM 206 through a SCSI port. However, one of skill in the art will appreciate that other interfaces, such as an IDE, an enhanced IDE, an ATAPI interface, etc. can be utilized. CDROM drive 206 supplies an analog audio signal directly to sound card 208, through audio cable 214, when an audio CD is being played by CD-ROM drive 206. Sound card 208 provides the analog audio signal (i.e., music) to a pair of speakers 210.

Figure 4:
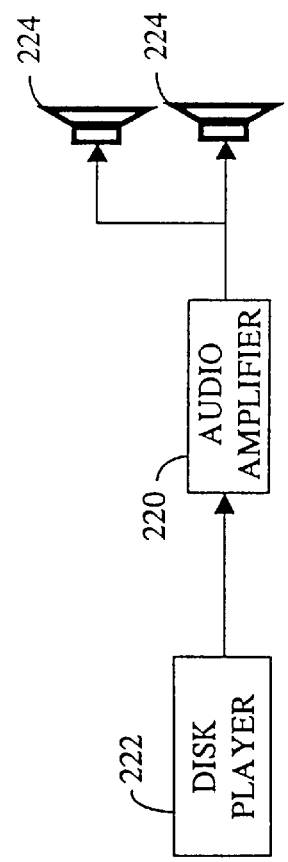
FIG. 4 is an electrical block diagram of a CD player coupled to an audio amplifier.

FIG. 4 depicts a home CD player 222 coupled to an audio amplifier 220. Audio amplifier 220 is coupled to at least two speakers 224 in a manner that is typical for a home stereo system.

Figure 5:
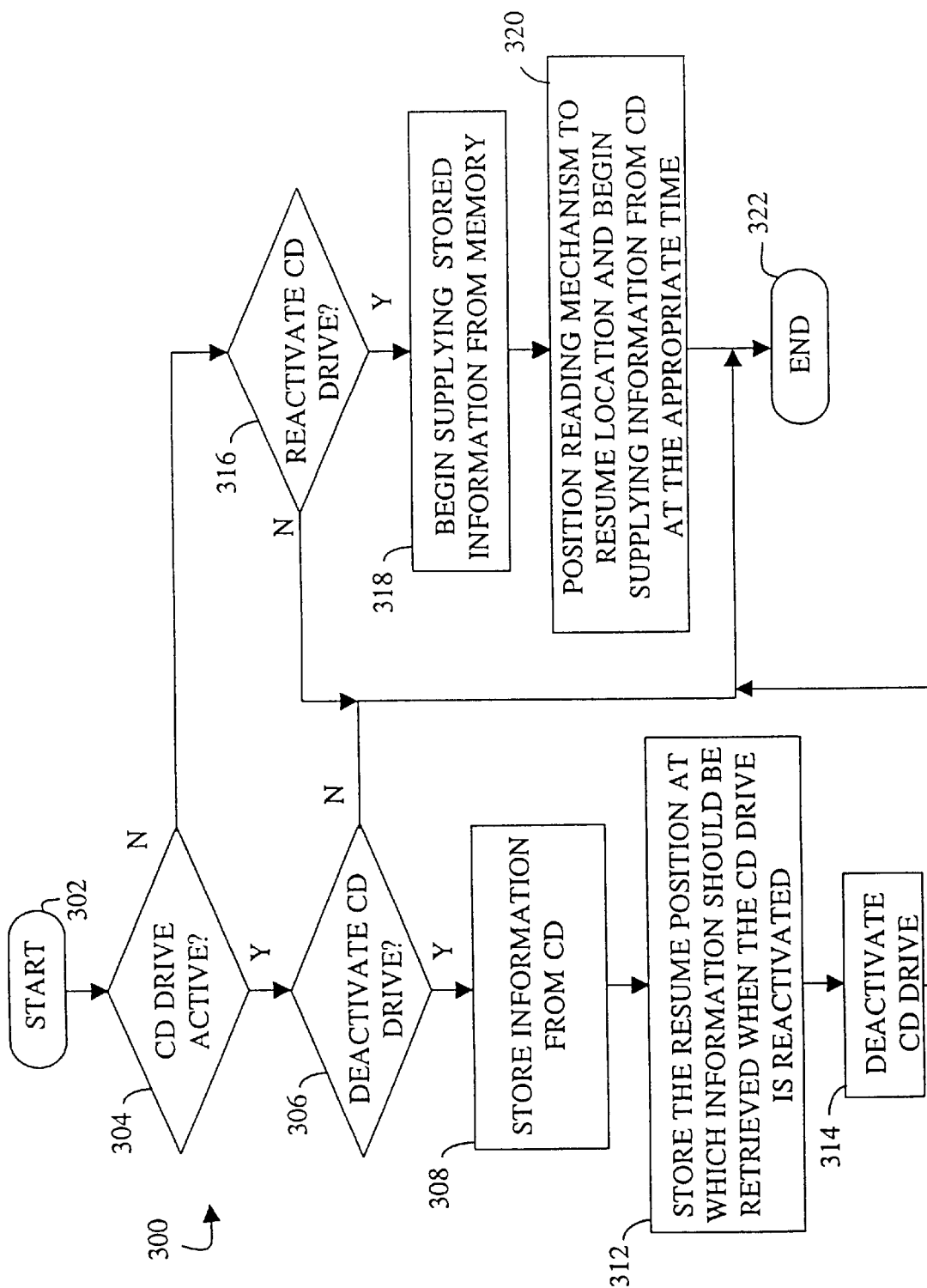
FIG. 5 is a flow chart of an instant-on control routine, according to an embodiment of the present invention.

FIG. 5 is a flow diagram of an instant-on control routine 300, according to an embodiment of a present invention. In step 302, routine 300 is initiated. Next, in step 304, routine 300 determines whether the CD drive is active. If so, control transfers from step 304 to step 306. If not, control transfers from step 304 to step 316. In step 306, routine 300 determines whether the CD drive is to be deactivated. If so, control transfers from step 306 to step 308. Otherwise, control transfers from step 306 to step 322 where routine 300 ends. In step 308, routine 300 normally causes information to be stored from a currently active CD (and potentially from a different CD in a random access CD player). One of skill in the art will appreciate that if the currently active CD is at the end of a track and the present invention is implemented in a random access CD player, which has selected a different CD to play music next, music is not stored from the currently active CD. That is, upon receiving a deactivation signal the random access CD player would store music from the next CD selected to provide music.

As discussed above, the stored information is audio information that is read ahead in contemplation of shutting down the CD drive. Then, in step 312, routine 300 stores a resume position at which information should be retrieved when the CD drive is reactivated. As mentioned above, the resume position preferably corresponds to an amount of audio information that is stored (such that the delay associated with the disk access time of the CD drive is negated). Depending on the implementation, the resume position may include a resume track, a resume disk and a resume time at which the CD drive should begin retrieving audio information from the resume track of the resume disk. Then, in step 314, power is removed from the spindle motor of the CD drive. Next, control transfers to step 322.

In step 306, when routine 300 determines that the CD drive is not active, control transfers from step 304 to step 316. In step 316, routine 300 determines whether the CD drive should be reactivated. That is, whether a user has reselected the CD player subsystem. If so, control transfers to step 316 to step 318. Otherwise, control transfers to step 322. In step 318, routine 300 causes the stored audio information to be supplied from the memory of the CD player subsystem. Next, the read head assembly is positioned to the resume position so that the read head assembly can begin supplying current (i.e., not stored) audio information read from the active CD. Finally, control transfers to step 322 where routine 300 terminates.

Thus, an instant-on control routine 300 has been described, which allows audio information to be stored from a CD (within memory of the CD player subsystem). This allows the CD player subsystem to operate in a manner similar to a radio receiver. That is, information is supplied almost instantaneously when the CD player subsystem is reselected such that the user is not confused by the lack of audio output from the audio system.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. A method that allows a disk drive to resume supplying audio information without the hesitation normally attributed to a disk access time, comprising the steps of:

receiving an indication that a disk drive should be deactivated;

storing audio information from a beginning position where audio information was last provided to a resume position;

storing the resume position at which the disk drive should begin retrieving audio information when the disk drive is reactivated; and deactivating the disk drive, wherein when the disk drive is reactivated the stored audio information is supplied without the hesitation normally attributed to a disk access time of the disk drive.

2. The method of claim 1, wherein the time period between the beginning position and the resume position is at least equal in time to an access time of the disk drive.

3. The method of claim 1, wherein the audio information is stored within a memory of the disk drive.

4. The method of claim 1, wherein the disk drive is a compact disk read-only memory (CD-ROM) drive and the disk is an audio compact disk (CD).

5. The method of claim 1, wherein the disk drive is an audio CD player and the disk is an audio compact disk (CD).

6. The method of claim 1, wherein the disk drive is a digital versatile disk (DVD) player.

7. The method of claim 1, wherein the step of storing the resume position at which the disk drive should begin retrieving audio information when the disk drive is reactivated, further includes the steps of:

storing a resume track;

storing a resume disk; and storing a resume time at which the disk drive should begin retrieving audio information from the resume track of the resume disk.

8. A disk drive that resumes providing audio information without the hesitation normally attributed to disk access time, the disk drive comprising:

a processor for controlling the operation of a disk drive;

a memory coupled to the processor for storing data; and processor executable code stored within the memory for causing the processor to perform the steps of:

receiving an indication that a disk drive should be deactivated;

storing audio information from a beginning position where audio information was last provided to a resume position;

storing the resume position at which the disk drive should begin retrieving audio information when the disk drive is reactivated; and deactivating the disk drive, wherein when the disk drive is reactivated the stored audio information is supplied without the hesitation normally attributed to a disk access time of the disk drive.

9. The method of claim 8, wherein the time period between the beginning position and the resume position is at least equal in time to an access time of the disk drive.

10. The disk drive of claim 8, wherein the audio information is stored within the memory of the disk drive.

11. The disk drive of claim 8, wherein the disk drive is a CD-ROM drive and the disk is an audio compact disk (CD).

12. The disk drive of claim 8, wherein the disk drive is an audio CD player and the disk is an audio compact disk (CD).

13. The disk drive of claim 8, wherein the disk drive is a digital versatile disk (DVD) player.

14. The disk drive of claim 8, wherein the processor executable code step of storing the resume position at which the disk drive should begin retrieving audio information when the disk drive is reactivated, further includes the steps of:

storing a resume track;

storing a resume disk; and storing a resume time at which the disk drive should begin retrieving audio information from the resume track of the resume disk.

15. An automotive entertainment system that includes a disk drive that resumes providing audio information without the hesitation normally attributed to disk access time, automotive entertainment system comprising:

a processor for controlling the operation of a disk drive;

an audio output device coupled to the processor;

a memory coupled to the processor for storing data; and processor executable code stored within the memory for causing the processor to perform the steps of:

receiving an indication that a disk drive should be deactivated;

storing audio information from a beginning position where audio information was last provided to a resume position;

storing the resume position at which the disk drive should begin retrieving audio information when the disk drive is reactivated; and deactivating the disk drive, wherein when the disk drive is reactivated the stored audio information is supplied without the hesitation normally attributed to the access time of the disk drive.

16. The automotive entertainment system of claim 15, wherein the time period between the beginning position and the resume position is at least equal in time to an access time of the disk drive.

17. The automotive entertainment system of claim 15, wherein the audio information is stored within the memory of the disk drive.

18. The automotive entertainment system of claim 15, wherein the disk drive is a CD-ROM drive and the disk is an audio compact disk (CD).

19. The automotive entertainment system of claim 15, wherein the disk drive is an audio CD player and the disk is an audio compact disk (CD).

20. The automotive entertainment system of claim 15, wherein the disk drive is a digital versatile disk (DVD) player and the disk is a DVD that includes audio information.

21. The automotive entertainment system of claim 15, wherein the processor executable code step of storing the resume position at which the disk drive should begin retrieving audio information when the disk drive is reactivated, further includes the steps of:

storing a resume track;

storing a resume disk; and storing a resume time at which the disk drive should begin retrieving audio information from the resume track of the resume disk.

22. The automotive entertainment system of claim 15, wherein the audio output device is a pair of speakers.

* * * * *